J. I. Monroe.
Horse Rake.
Nº 63079    Patented Mar. 19, 1867.

Witnesses:
F. A. Jackson
Wm Freurn

Inventor;
Jno I Monroe
Per Munn & Co
Attorneys.

United States Patent Office.

JOHN I. MUNROE, OF BURLINGTON, MASSACHUSETTS.

Letters Patent No. 63,079, dated March 19, 1867.

---

IMPROVEMENT IN HAY RAKES.

---

The Schedule referred to in these Letters Patent and making part of the same.

---

TO ALL WHOM IT MAY CONCERN:

Be it known that I, JOHN I. MUNROE, of Burlington, in the county of Middlesex, and State of Massachusetts, have invented a new and useful Improvement in Hay Rake; and I do hereby declare that the following is a full, clear, and exact description thereof, which will enable others skilled in the art to make and use the same, reference being had to the accompanying drawing, forming a part of this specification, in which—

Similar letters of reference indicate like parts.

Figures 1, 2:
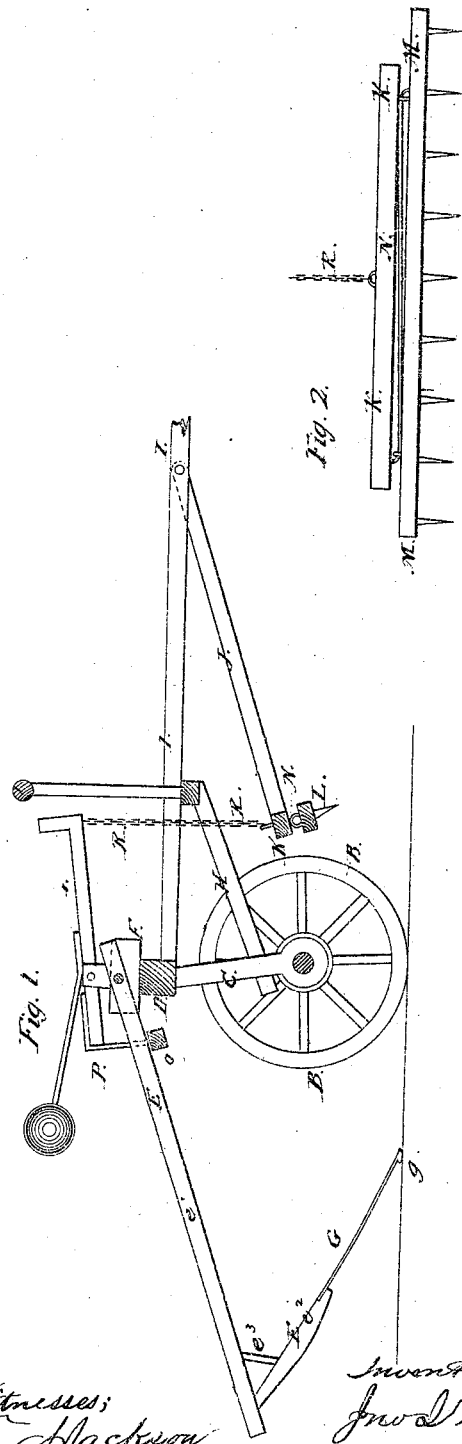
Figure 1 is a vertical longitudinal section of my improved hay rake.
Figure 2 is a detail view of the divider.

My invention consists in the combination of a divider with the frame of the rake so constructed and arranged that when the teeth are raised to discharge the collected hay and form a windrow, the divider may at the same time drop down into the spread hay and separate or divide it, so that when the rake-teeth descend, after passing over the windrow, and the divider rises, the said teeth may drop down into the space thus cleared, and no hay be left scattered or trailing behind the rake.

A is the axle, and B the wheels of the rake, C are the uprights that support the frame of the rake. The lower ends of the uprights C are attached to the axle A, and to their upper ends is attached the beam D, upon which the teeth E of the rake are pivoted. To the upper side of the beam D are securely attached blocks, F, of a breadth equal to the desired space between the teeth. The upper ends of the long part $e^1$ of the teeth E are pivoted between and to these blocks. To the lower ends of the long part $e^1$ of the teeth E are securely attached the upper ends of the short part $e^2$ of said teeth. The parts $e^1$ and $e^2$ meet each other at an acute angle, and the connection is strengthened by the short braces $e^3$, one end of which is attached to the part $e^1$, and the other end to the part $e^2$. By this construction the hay is collected by and drawn along upon the said teeth until the rake-head is full; it is then discharged to form a windrow. G are elastic tips attached to the lower ends of the parts $e^2$ of the teeth E. These tips come in contact with the ground, and when they encounter an obstruction their elasticity enables them to pass over it without rising so high as to scatter the collected hay. Upon the lower end of the elastic tips G are formed small knobs or shoes, $g^1$, so that the said tips may slide freely over the ground. H are strengthening braces extending from the lower ends of the uprights C up to the frame of the rake to brace and strengthen it. I are the draught bars or thills of the rake, to the outer sides of which, near their forward ends, are pivoted the forward ends of the bars J. The rear ends of the bars J are securely attached to the ends of the cross-bar K. L are the teeth of the divider; the upper ends of which are secured to the cross-bar or head M in the ordinary manner. The divider-head or cross-bar M is connected with the bar K by the spring hinge N. The hinge N is formed of a steel rod, one end of which is securely attached to the upper side of the bar M near one end; it then passes through an eye or staple securely attached to the under side of the bar K, near its end, thence it passes along between the bars K and M, through an eye or staple attached to the upper side of the bar M, near its other end, and its end is securely attached to the under side of the bar K, thus becoming at the same time a hinge to allow the divider-head to give in passing over an obstruction, and a spring to bring it back to the proper position as soon as the obstruction has been passed. O is a bar, extending across the rake below the forward ends of the long parts $e^1$ of the rake-teeth a little in the rear of the beam D. This bar is attached to and supported by the lower end of the bent lever P, which is pivoted to suitable supports just above the blocks F, as shown. The forward end of the lever P extends forward into such a position as to be reached and operated by the driver. R is a chain, the upper end of which is attached to the forward end of the lever P, and its lower end is attached to the bar K of the divider. The chain R is of such a length that when the teeth E are in contact with the ground, the divider will be held suspended at such a height as to clear the spread hay. But when the teeth are raised, by lowering the forward end of the lever P to discharge the collected hay from the rake, the divider will be lowered so as to come in contact with the ground and divide or separate the spread hay as before described. S is a weight suspended from the rear end of the lever P, and is of such a weight as to a little more than balance the divider, so that when the parts are left free the said divider will be held suspended and the teeth of the rake be in contact with the ground.

Having thus described my invention, I claim as new, and desire to secure by Letters Patent—

The combination of the divider J, K, L, M, N, chain R, or equivalent, lever P, teeth E, and frame of the rake with each other, substantially as herein shown and described and for the purpose set forth.

JOHN I. MUNROE.

Witnesses:
SPARROW HORTON,
CYRUS TAY.